May 20, 1952 F. SCHWARZER 2,597,679
FISHING HOOK
Filed April 22, 1947
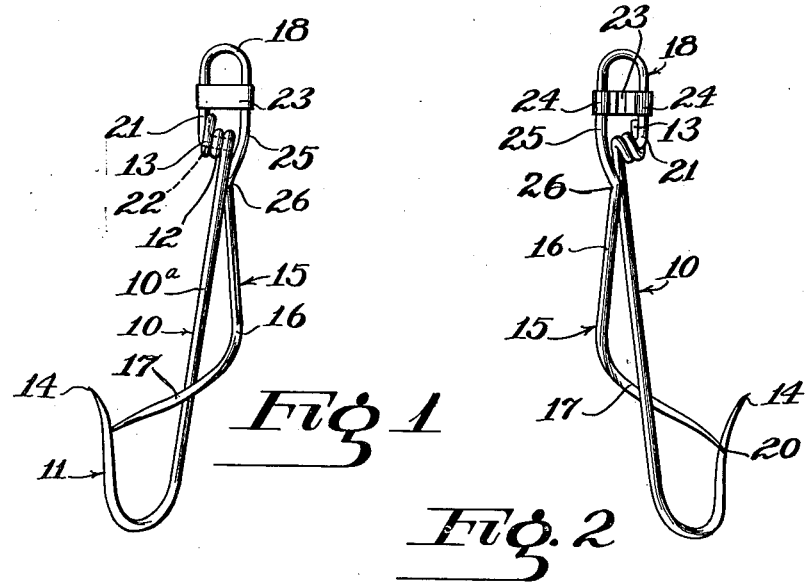
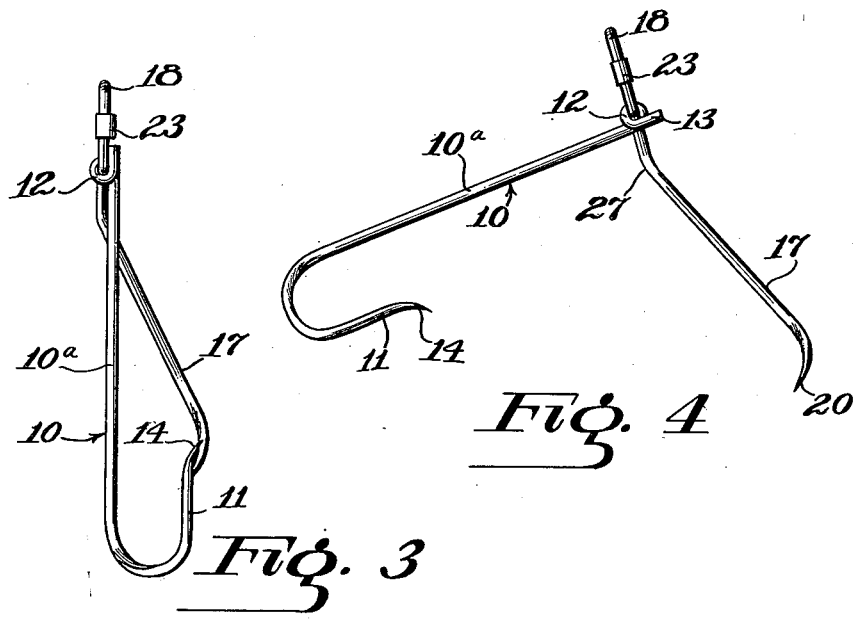
INVENTOR,
Fred Schwarzer
BY
Christian R. Nielsen
ATTORNEY Patented May 20, 1952

2,597,679

UNITED STATES PATENT OFFICE 2,597,679

FISHING HOOK

Fred Schwarzer, Pottstown, Pa.

Application April 22, 1947, Serial No. 743,050

2 Claims. (Cl. 43—44.8)

This invention relates to fishing hooks. An object of the invention is the provision of a fishing hook which is minus the usual barb but is provided with a guard cooperating with the hook for preventing the loss of the bait and likewise the fish from the hook.

Another object of the invention is the provision of a fishing hook which is minus the usual barb, said hook being equipped with a spring member having a pointed end which is pressed into contact with an intermediate portion of the hook proper to prevent the loss of bait from the hook, said spring member acting as a guard to retain the fish on the hook while permitting the fish to swallow said hook.

A further object of the invention is the provision of a fishing hook in which a spring wire has a hook at one end and a bearing at the other end, a second spring wire having one end bent to form an eye and an axle which is received by the bearing so that the free ends of the wires may be moved away from each other, the free end of the second wire being bent to form a guard for engagement with the free portion of the hook to prevent the loss of bait and likewise the fish from the hook, the second wire adjacent the eye having a sharply bent portion to provide a detent engageable with the first wire for retaining the guard in operative relation with the hook, release of the detent permitting the guard to be swung freely away from the hook.

The invention consists in the novel constructions, arrangements and combinations of parts hereinafter more particularly described and claimed.

In the drawings:

Figure 1 is a front view in elevation of an improved fish hook.

Figure 2 is a rear view in elevation of the fish hook.

Figure 3 is a side view in elevation of the fish hook, and

Figure 4 is a side in elevation of the hook shown in open position.

Referring more particularly to the drawings, 10 designates a spring wire which has its free end bent into the form of a hook 11. The opposite end has been formed into a horizontally disposed coil 12 to provide a bearing with the free end 13 of the wire at one end of the coil projecting beyond said coil, for a purpose which will be presently described.

The hook 11 has substantially the same characteristics as a normally constructed hook except the usual barb which is adapted to pierce a wall of the throat of a fish, when the bait and hook have been swallowed is eliminated. Said hook has a pointed end 14 slightly turned outwardly which when swallowed will penetrate the wall of the throat of the fish when said fish pulls on the line.

It will be noted that the portion of the wire 10 which forms the shank 10-a is substantially straight. This straight shank terminates at one end in the hook 11 and in the end in the bearing coil 12.

A second spring wire 15 has a substantially straight portion 16, an angularly bent portion 17 and an eye 18 having paarallel legs 21 and 25. The spring wire 15 is so arranged with respect to the wire 10 and its components that a point 20 on the free end of the angular portion 17 which forms a guard, will contact the hook 11.

The upper end of the wire 15 is bent into the form of a loop to provide the eye 18 to which is attached a fishing line in any approved manner. One leg 21 of the eye terminates in a right angularly bent portion 22 forming an axle which is received by the bearing coil 12 so that the wire 15 may be rocked on the upper end of the wire 10. While the wire 15 is relatively rigid a brace or connecting member 23 formed of a flat metal strip has its free ends 24 inturned to engage over the parallel legs 21 and 25 of the eye 18 for aiding in maintaining the axle 22 in the bearing coil 12.

It will be noted that the wire 15 at the end of the leg 25 of the eye 18 has a sharp inbent portion at 26 to provide a detent 27 for engagement with the shank portion 10-a of the wire 10 for maintaining the guard 17 in an operative position with the hook 11. However, when a sufficient pull is exerted on the guard while the shank 10-a is held stationary the guard and shank will be forced apart, as shown in Figure 4.

The member 13 on one end of the bearing coil 12 when in engagement with the leg 21 of the eye 18 cooperates with the detent 27 when engaged with the straight portion 16 of the wire 15 for retaining the guard in operative protective relation with the hook 11 when the hook has been provided with bait.

The free end 20 of the guard 17 will not obstruct the swallowing of the hook but when the hook has been swallowed and the fish which has been caught pulls on the line, the free end of the guard will act as a barb to prevent ready release of the hook. Furthermore, said free end 20 of the guard will tend to spring rearwardly in the throat of the fish to permit those portions of the gills or other parts of the walls of the mouth of the fish which have been caught by the hook, to pass beyond the free end of the guard so that the point 20 of the guard will penetrate said portions of the fish and prevent ready release of the hook.

The guard 17 as shown in Figure 4 is moved away from the hook 11 and a bait is placed on the hook. The guard is then returned to the position shown in Figure 3. The free end 20 of the guard being in engagement with the hook will prevent the bait from being removed by the fish or from being lost by accident.

I claim:

1. A fishing hook comprising first and second spring wire members, the first of said members having a horizontally disposed coil at one end forming a bearing, an end of the second member forming an axle which is received by the bearing, said last-mentioned end having an eye formed as a continuation of the axle to receive one end of a fishing line, a portion of the second spring member adjacent the eye being sharply inbent to form a detent which is engageable with the first spring member for retaining said members in coacting engagement, a barbless hook on the other end of the first spring member and a guard on the other end of the second spring member which is engageable with the hook for preventing the loss of a fish from the hook.

2. A fishing hook comprising a shank having a barbless hook member at one end and a coil at the other end forming a bearing and a spring guard member having an axle received by the bearing and an eye forming a continuation of said axle, a portion of the guard member being sharply inbent to form a detent which is engageable with the shank of the hook member for retaining the hook member and guard in coacting engagement, said guard being curved and of such a length as to contact the point of the barbless hook member and the shank of the barbless hook projecting beyond the coil in such a manner as to be engageable with a portion of the eye for aiding in maintaining the guard and the hook in operative engagement.

FRED SCHWARZER.

REFERENCES CITED

The following references are of record in the file of this patent:

UNITED STATES PATENTS

| Number | Name | Date |
|---|---|---|
| 196,648 | Edgar | Oct. 30, 1877 |
| 534,682 | Burgess | Feb. 26, 1895 |
| 675,853 | Edgar | June 4, 1901 |
| 1,325,530 | Ore | Dec. 23, 1919 |

FOREIGN PATENTS

| Number | Country | Date |
|---|---|---|
| 71,857 | Norway | Mar. 24, 1947 |
| 105,996 | Sweden | Sept. 24, 1942 |
| 362,821 | Great Britain | Dec. 10, 1931 |